B. A. LAWS, J. McELWAIN & M. M. LAIRD.
APPARATUS FOR FILLING CONFECTIONS.
APPLICATION FILED MAR. 13, 1912.

1,118,362.

Patented Nov. 24, 1914.
12 SHEETS—SHEET 1.

WITNESSES

INVENTORS

B. A. LAWS, J. McELWAIN & M. M. LAIRD.
APPARATUS FOR FILLING CONFECTIONS.
APPLICATION FILED MAR. 13, 1912.

1,118,362.

Patented Nov. 24, 1914.

WITNESSES
R A Balderson

INVENTORS
B. A. Laws
Jas. McElwain
M. M. Laird

B. A. LAWS, J. McELWAIN & M. M. LAIRD.
APPARATUS FOR FILLING CONFECTIONS.
APPLICATION FILED MAR. 13, 1912.
1,118,362. Patented Nov. 24, 1914.
12 SHEETS—SHEET 6.
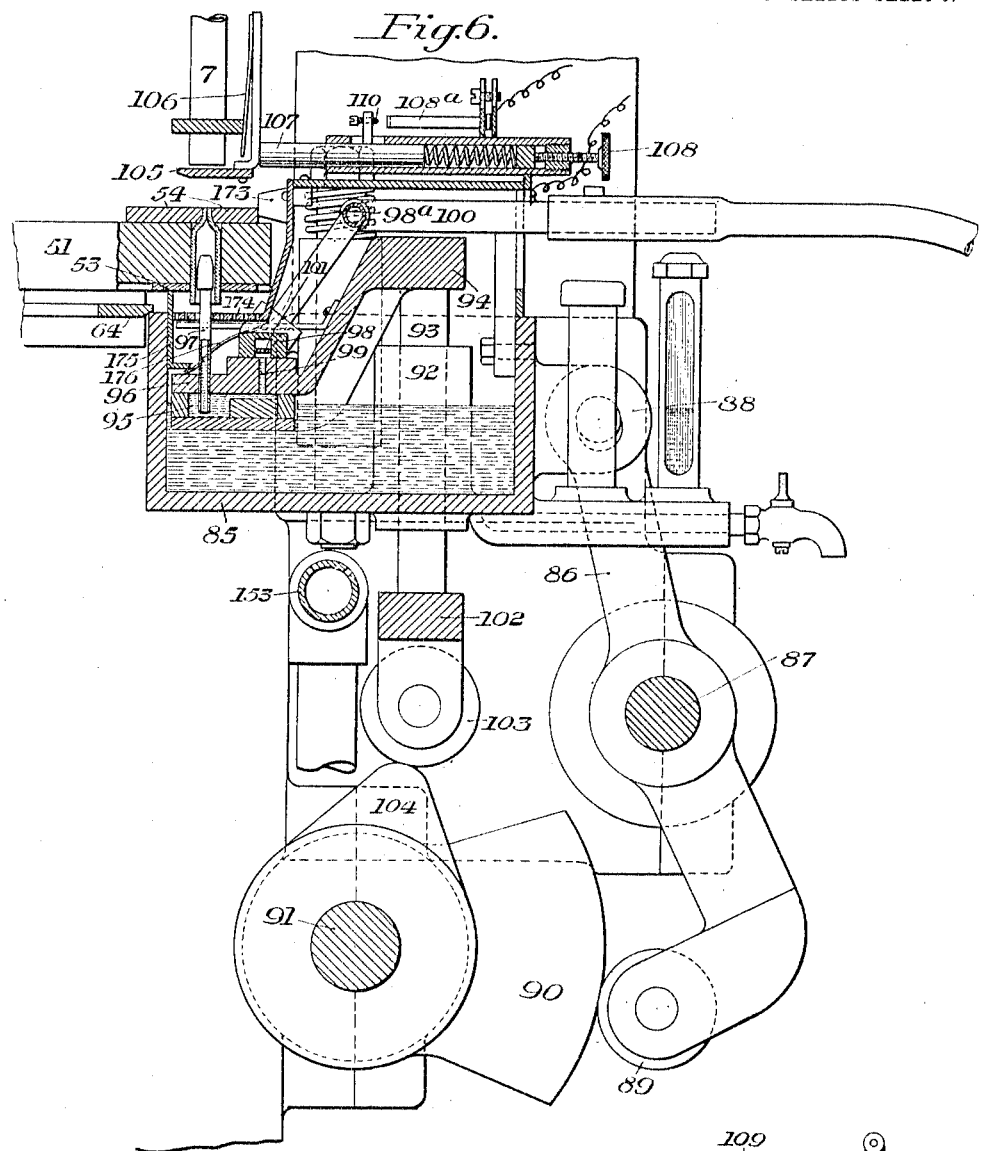
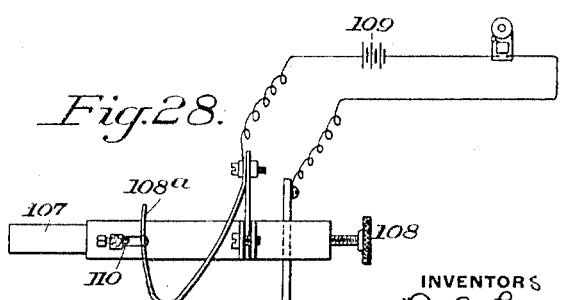

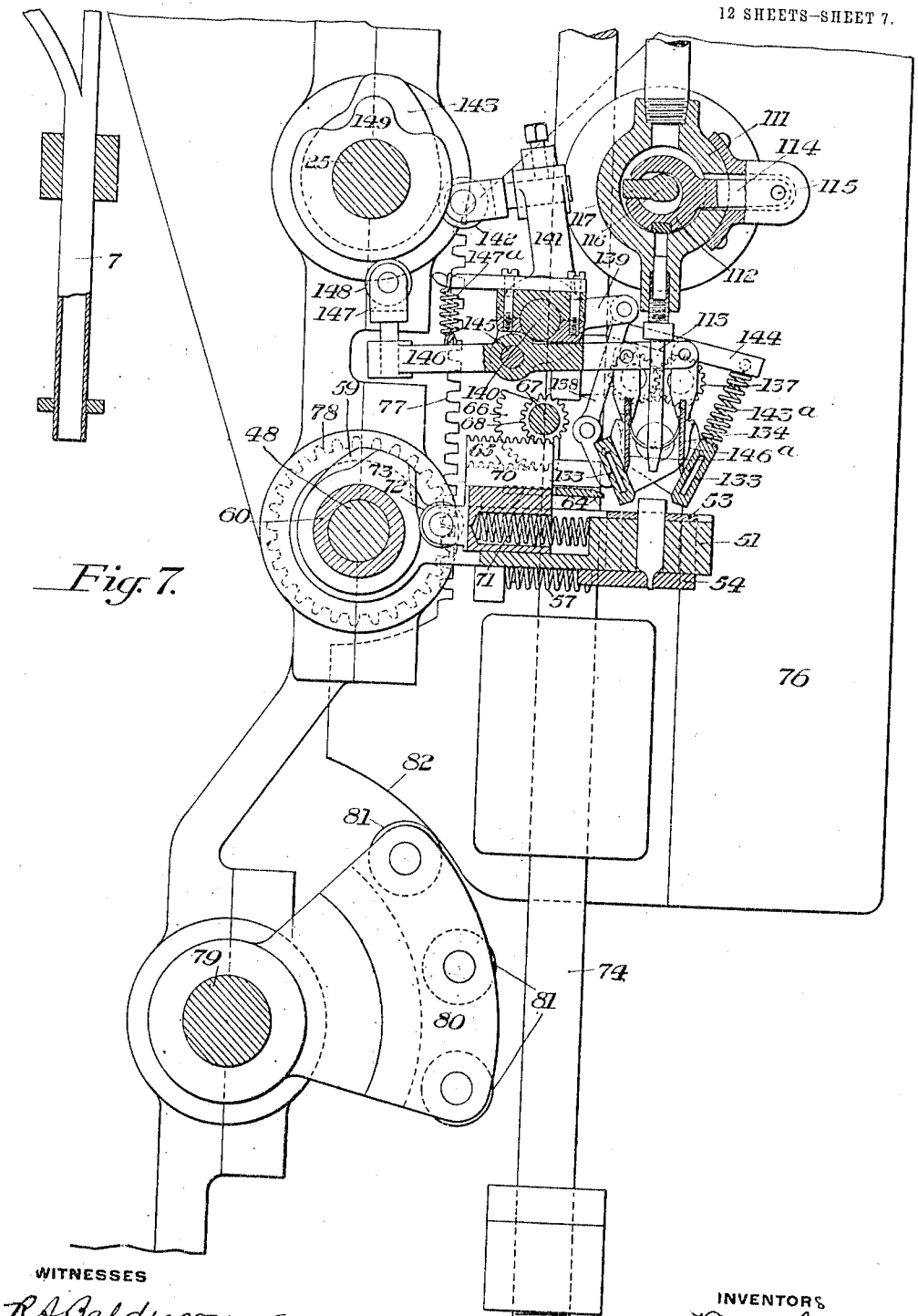

B. A. LAWS, J. McELWAIN & M. M. LAIRD.
APPARATUS FOR FILLING CONFECTIONS.
APPLICATION FILED MAR. 13, 1912.
1,118,362.
Patented Nov. 24, 1914.
12 SHEETS—SHEET 9.
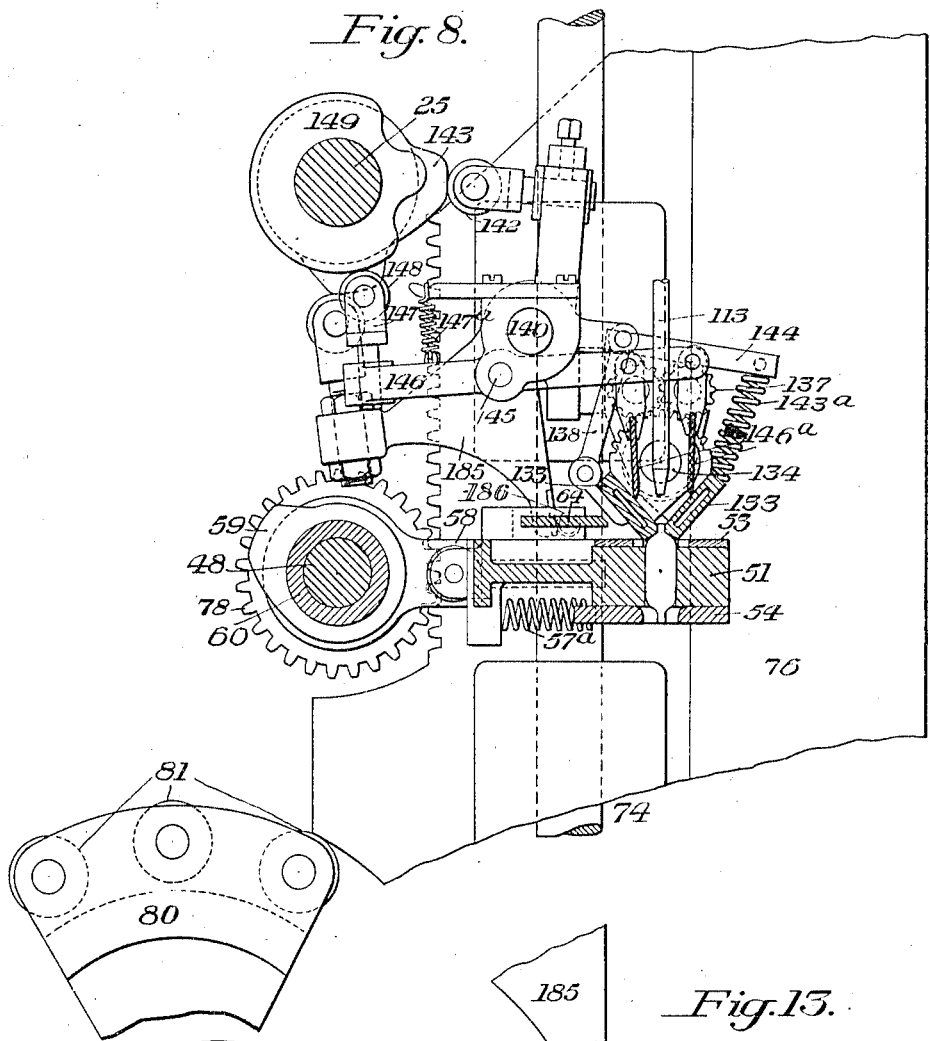
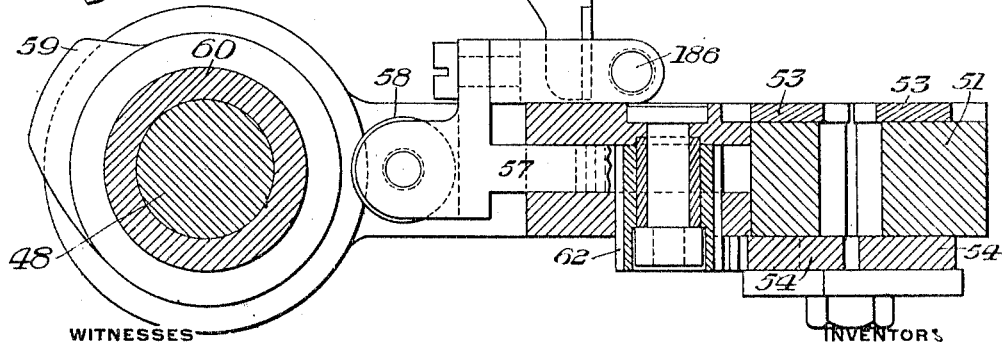

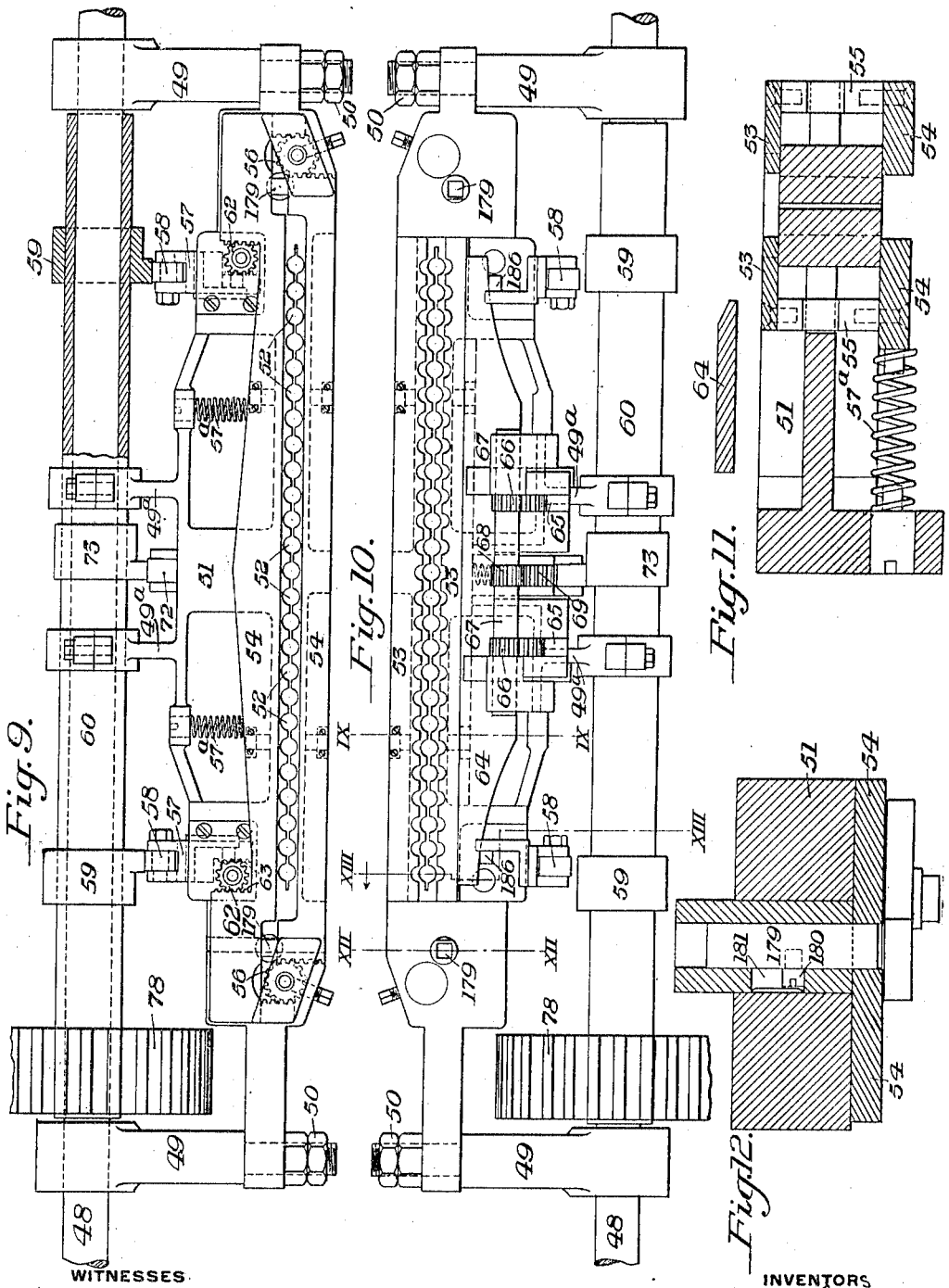

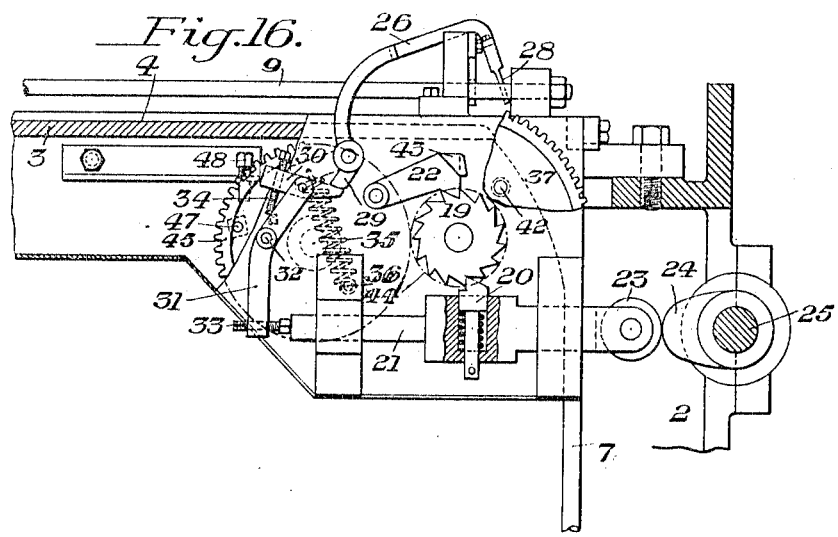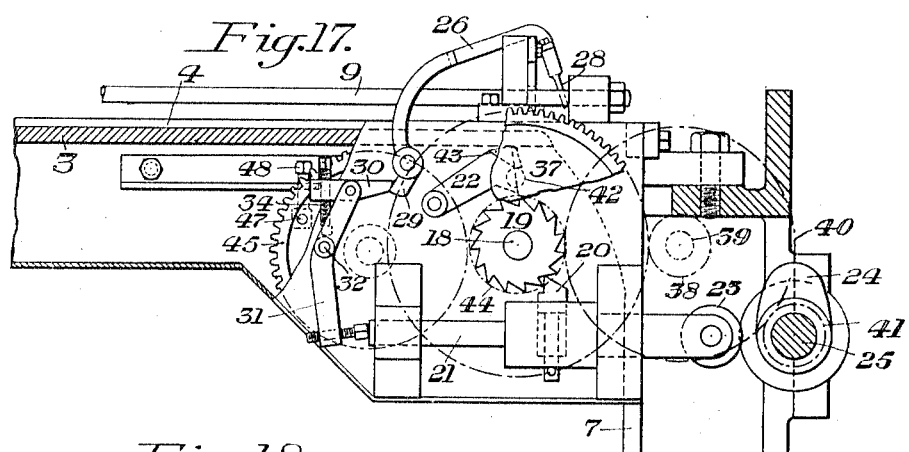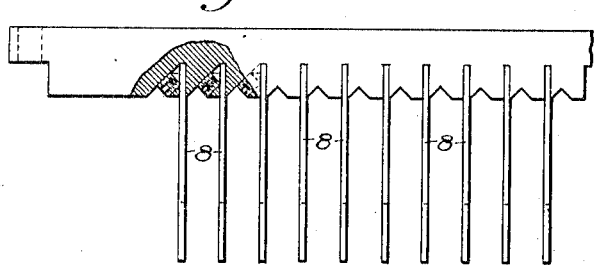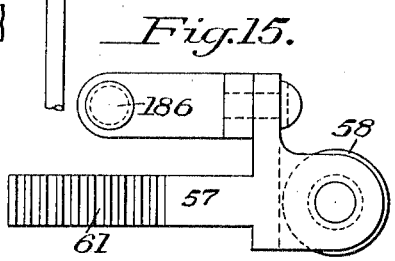

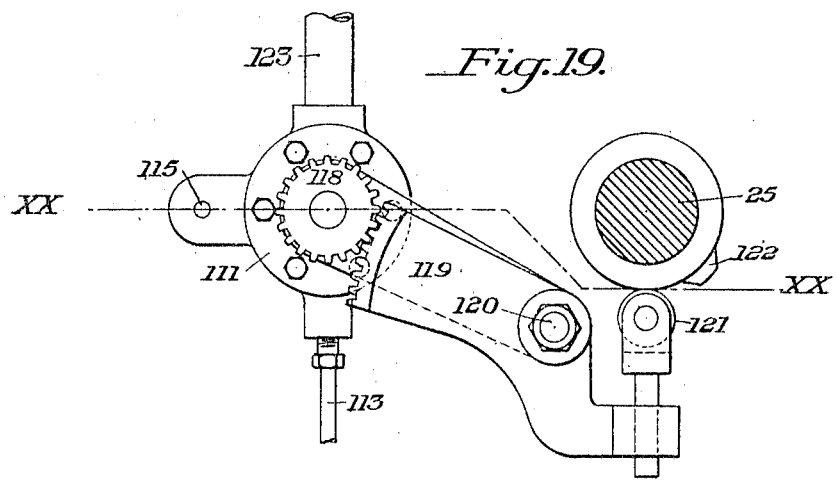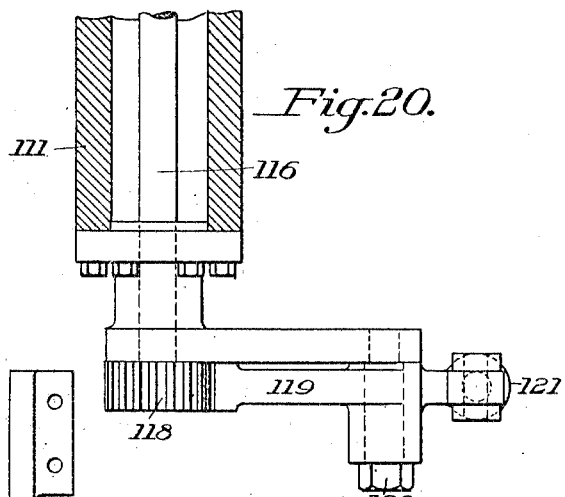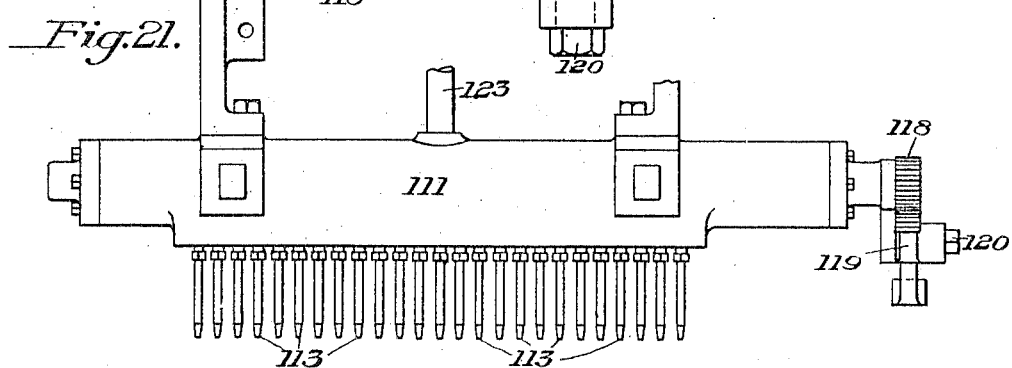

B. A. LAWS, J. McELWAIN & M. M. LAIRD.
APPARATUS FOR FILLING CONFECTIONS.
APPLICATION FILED MAR. 13, 1912.
1,118,362. Patented Nov. 24, 1914.
12 SHEETS—SHEET 12.
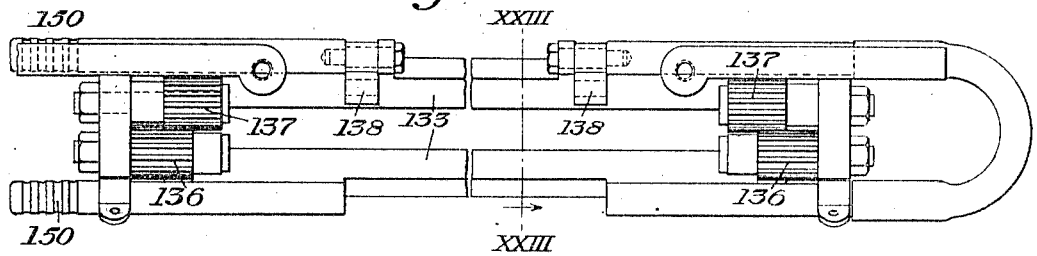
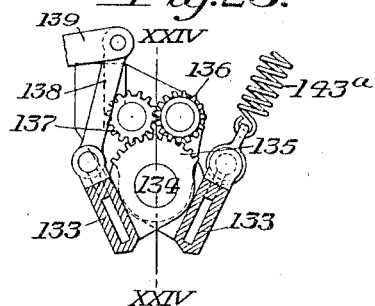
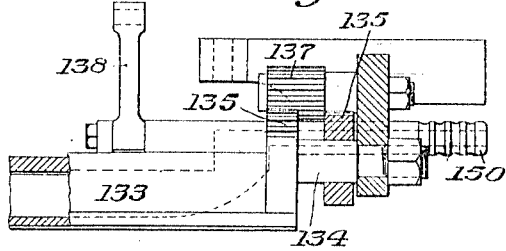
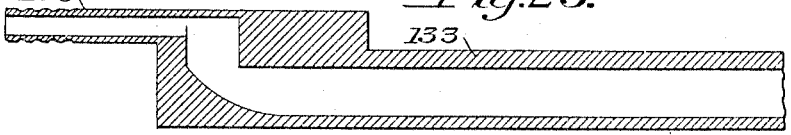
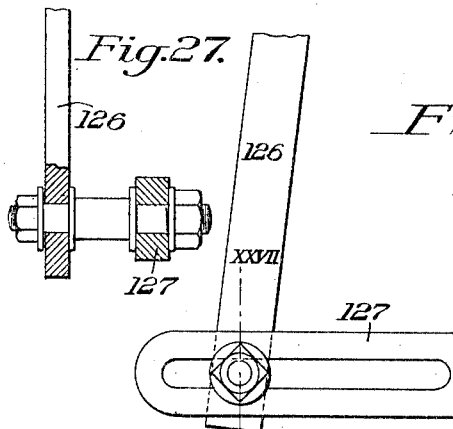
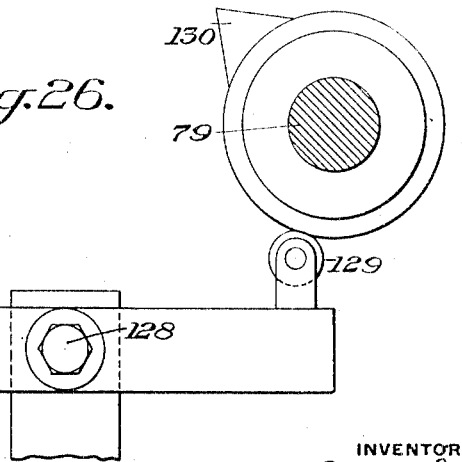
WITNESSES
R A Balderson
W Samaries
INVENTORS
B. A. Laws
Jas. McElwain
M. M. Laird
by Bakewell, Byrnes & Parmelee
Attys.

UNITED STATES PATENT OFFICE.

BENJAMIN A. LAWS, JAMES McELWAIN, AND MOSES M. LAIRD, OF PITTSBURGH, PENNSYLVANIA, ASSIGNORS TO WHEELING GUM COMPANY, OF WHEELING, WEST VIRGINIA, A CORPORATION OF WEST VIRGINIA.

APPARATUS FOR FILLING CONFECTIONS.

1,118,362.  Specification of Letters Patent.  Patented Nov. 24, 1914.

Application filed March 13, 1912. Serial No. 683,581.

*To all whom it may concern:*

Be it known that we, BENJAMIN A. LAWS, JAMES McELWAIN, and MOSES M. LAIRD, all residents of Pittsburgh, in the county of Allegheny and State of Pennsylvania, have invented a new and useful Apparatus for Filling Confections, of which the following is a full, clear, and exact description, reference being had to the accompanying drawings, forming part of this specification, in which—

Figure 1:
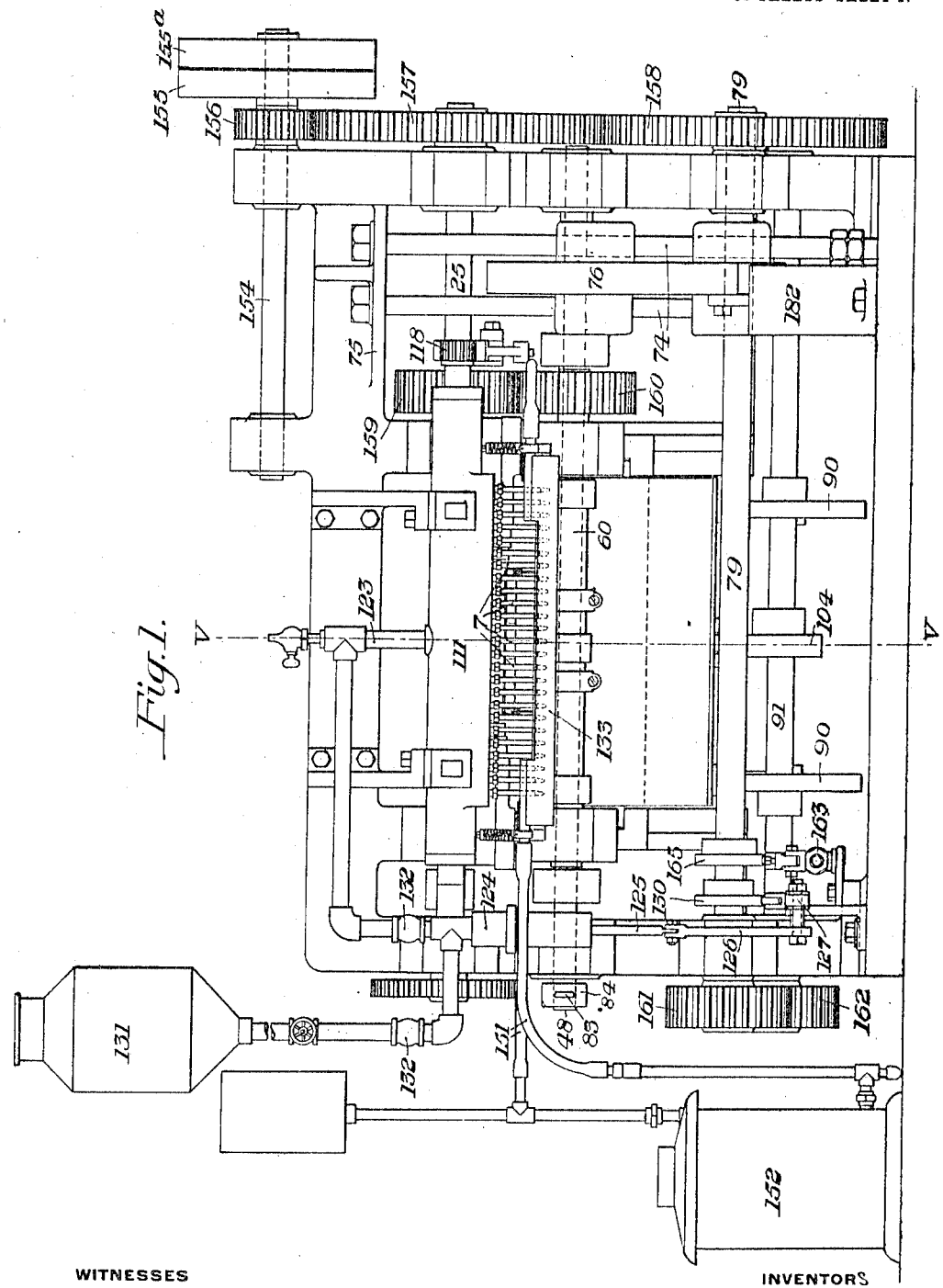
Figure 2:
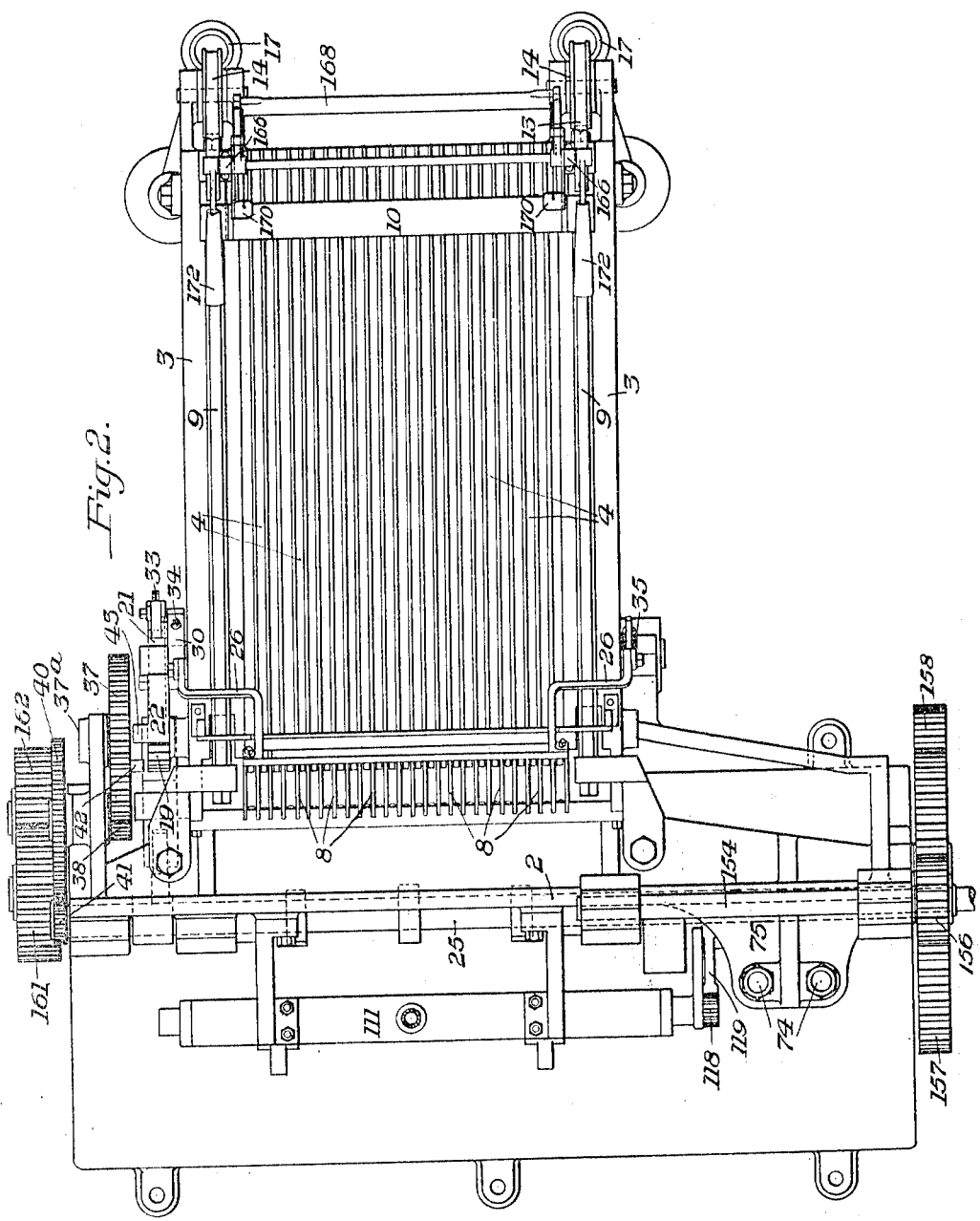
Figure 3:
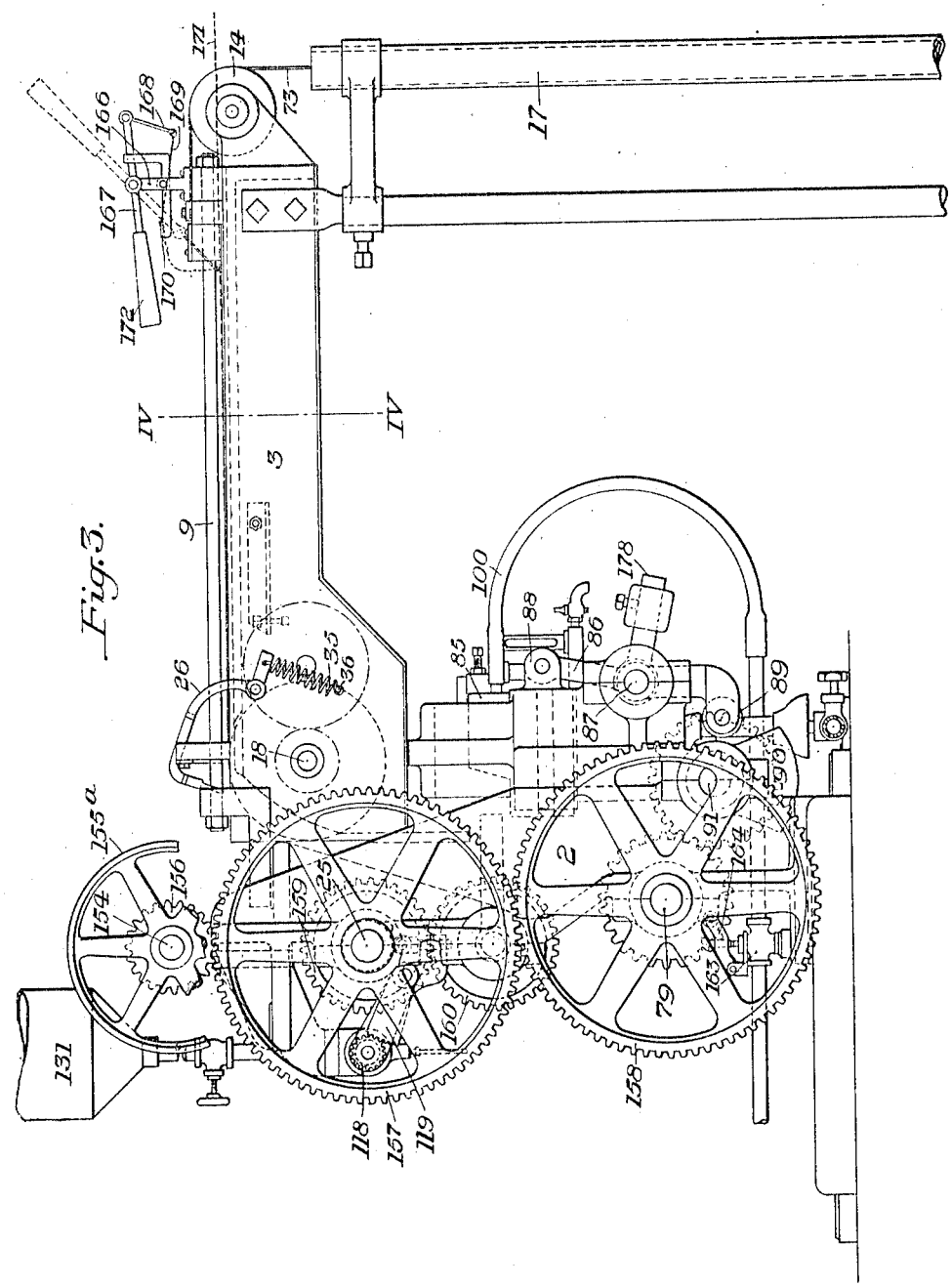
Figure 4:
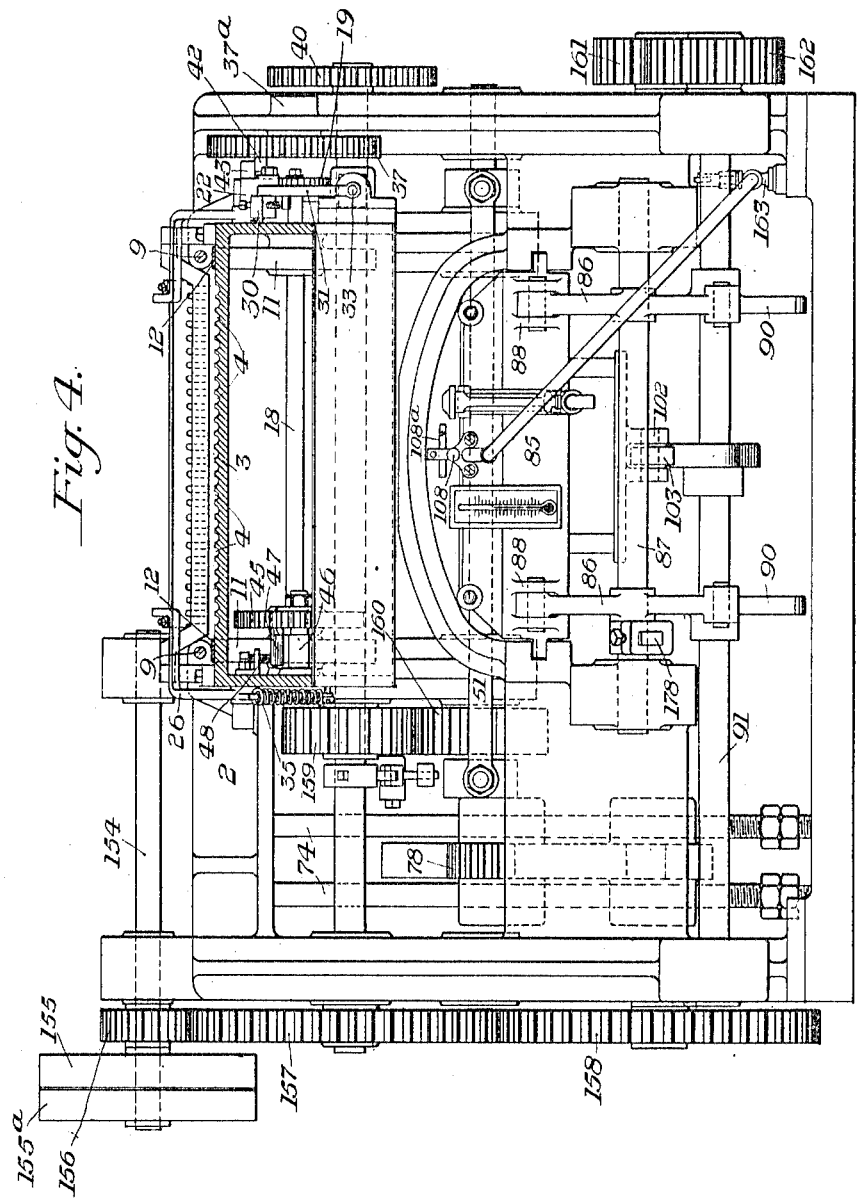
Figure 5:
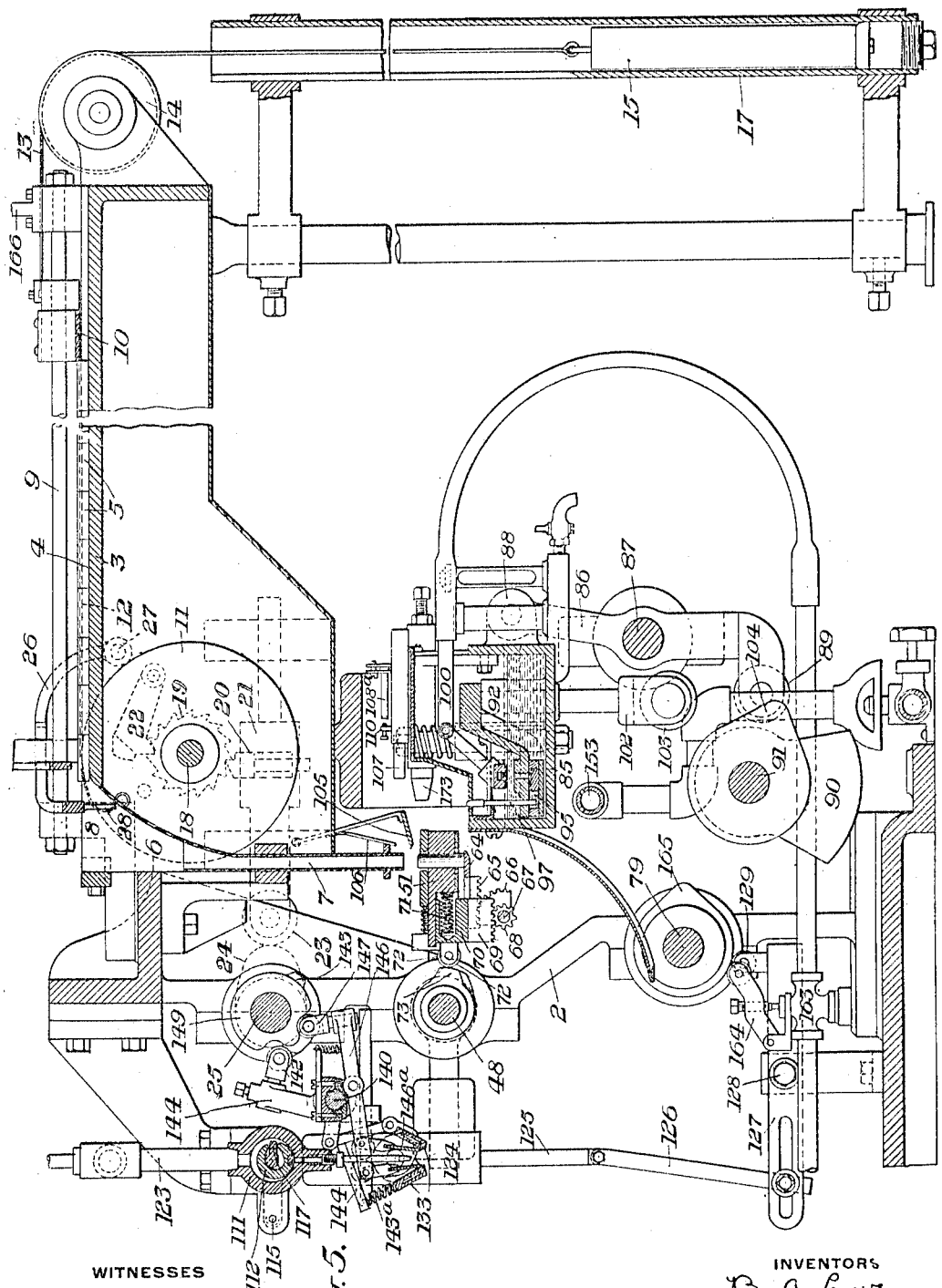

Figure 1 is an end view of one form of our improved apparatus for filling confection tubes. Fig. 2 is a plan view thereof. Fig. 3 is a side elevation of the same. Fig. 4 is a sectional view on the line IV—IV of Fig. 3. Fig. 5 is a longitudinal section on the line V—V of Fig. 1. Fig. 6 is a detail sectional view through the tank containing the moisture-resisting material, showing the parts when they are moved into the position for coating the tubes to be filled. Fig. 7 is a detail sectional view showing the filling mechanism, together with the tube-closing mechanism. Fig. 8 is a similar view, showing the parts in a different position. Fig. 9 is a top plan view of the tube-holding device. Fig. 10 is a bottom plan view of the same. Fig. 11 is a sectional view on the line XI—XI of Fig. 10. Fig. 12 is a similar view on the line XII—XII of Fig. 10. Fig. 13 is a similar view on the line XIII—XIII of Fig. 10. Figs. 14 and 15 are detail views of the actuating racks for operating the pinch bars on the tube holding device. Figs. 16 and 17 are detail sectional views, showing the tube feeding mechanism. Fig. 18 is a plan view of the separating bars for the tubes between which the confection tubes are fed to the feeding device. Fig. 19 is a side elevation of the valve for feeding the syrup to the tubes, together with the actuating mechanism therefor. Fig. 20 is a sectional view on the line XX—XX of Fig. 19. Fig. 21 is a face view of the same. Fig. 22 is a plan view of the pinch bars for finally closing the confection tubes and the operating mechanism therefor. Fig. 23 is a sectional view on the line XXIII—XXIII of Fig. 22. Fig. 24 is a similar view on the line XXIV—XXIV of Fig. 23. Fig. 25 is a detail sectional view of one of the pinch bars. Fig. 26 is a detail view of the pump actuating mechanism for feeding the syrup to the tubes. Fig. 27 is a detail sectional view on the line XXVII—XXVII of Fig. 26, and Fig. 28 is a detail view of a signaling device.

This invention relates to apparatus for filling confection tubes with syrup, and is more particularly applicable to filling tubes of chewing gum with syrup or flavoring matter.

The object of our invention is to provide an apparatus for simultaneously coating the interior of a plurality of confection tubes with a moisture-resisting substance, then filling with a syrup or flavoring solution, and then sealing the tubes in a rapid, and accurate manner. This particular device is so arranged that the tubes are first fed to a holder in which they are centered, and one end of each tube is then sealed. A moisture-resisting material, preferably of a waxy nature, is then injected into the interior of each tube through its lower open end and the tube holder, together with the tubes, is then reversed so as to bring the open mouths of the tube below the syrup feeding nipples, through which a predetermined amount of syrup is injected into each tube. The other end of each tube is then closed, and after being so closed, the tubes are released from the holding device and are permitted to fall through such device into a properly placed receptacle.

The precise nature of our invention will be best understood by reference to the accompanying drawings, which will now be described, it being premised, however, that various changes may be made in the details of construction and general arrangement of the parts, without departing from the spirit and scope of our invention, as defined in the appended claims.

In the drawings, the numeral 2 designates the main frame of the machine on which the various parts of the device for carrying out our invention are supported. The upper portion of the frame of the machine is provided with a rack 3 having a plurality of grooves 4 in which the confection tubes 5 to be filled are placed. The front end of each of these channels opens into a chute 6; and 7 are conveyer tubes leading from the lower end of the tube 6 to a point immediately above the openings in the confection tube holding device, as hereinafter described. The upper end of the chute 6 is divided into as many spaces as there are channels or grooves in the rack 3 by means of the plates 8. Slidably mounted on the longitudinally extending rods 9 at the side of the rack 3 is a feeding bar 10.

11—11 indicate winding drums on the opposite sides of the machine to the peripheries of which are attached metallic bands 12; the other ends of these bands being attached to the feeding bar 10.

13 are bands which are also connected to the feed bar 10 and extend rearwardly over the sheaves 14. Connected to the ends of these bands are the weights 15 which are slidably mounted in dash-pots 17. These weights are arranged to return the feeding bars to the rear end of the machine after several sets of tubes have been filled, as hereinafter described.

The drums 11 are connected to a shaft 18 journaled in the frame of the machine, and connected to this shaft is a ratchet wheel 19 which is engaged by means of a spring pressed pawl 20 mounted in a slide 21 on one side of the machine.

22 designates a retaining pawl for the ratchet wheel 19.

Mounted on the end of the slide 21 is an antifriction roller 23, which is engaged by a cam 24 on a continuously rotated shaft 25, which shaft makes one rotation for each filling operation.

Pivotally mounted at 27 on the frame of the machine and extending above the rack 3, is an arm 26, the front end of which is provided with a plurality of fingers 28 which extend down between the division plates 8, and are arranged to break off the tubes to be filled at the separating point if the first tube should stick to the second tube in the rack.

Extending from a boss on the rocker arm 26 is a projection 29 which is in the line of movement of a gravity actuated pawl 30 pivoted on the end of a lever 31, which is pivoted to the frame of the machine at 32. Extending horizontally in line with the slide 21 is a screw 33 arranged to be struck by the slide in its movement when actuating the ratchet wheel 19. The gravity pawl 30 is provided with an adjusting screw 34 for adjusting the position of the front end of the pawl.

35 is a tension spring connected to a lug 36 on the boss of the rocker arm on the opposite side of the machine and arranged to return the rocker arm 26 to its upper position, as shown in Fig. 3.

The operation of the feeding device for the tube is as follows: The slide 21 is reciprocated for each round of the machine, and will move the ratchet wheel 19 the distance of one tooth, which will in turn rotate the drums 11 and move the feeding bar 10 a distance which is equal to the length of one of the confection tubes 5. The feeding bar will move the first set of tubes 5 into the chute 6, through which they drop by gravity to the various tubes 7. If any of the tubes should stick to the next tube, the fingers 28 on the rocker arm 26 will engage them and snap them off by the quick motion of the rocker arm. During the movement of the slide 21, the lever 31 will be rocked, which will in turn rock the arm 26 into the position shown in Fig. 17, and as soon as the pawl 30 has passed the projection 29, the rocker arm 26 will drop by gravity downward to break off any of the tubes which stick to the adjacent tubes. The rocker arm will then be returned to the position shown in Fig. 3, by the spring 35.

The rack 3 is long enough to hold fifteen tubes 5 in each of the grooves 4; and at each rotation of the machine, one set of the tubes is filled. After the machine has made fifteen cycles the pawl 22 is raised to release the ratchet wheel 19 and permit the weights 15 to return the feeding bar to its rearmost position.

Pivotally mounted on a stud 37ª and in line with the shaft 18 is a gear wheel 37 which meshes with a pinion 38 on a countershaft 39, to which is connected a gear wheel 40 which is in mesh with a pinion 41 on the shaft 25. The ratio of the gears 40, 41 and 37 is about 15 to 1, so that the gear 37 will make a complete cycle for each 15 filling operations. Extending inwardly from the gear 37 is a pin 42, and extending outwardly from the dog 22 is a cam projection 43, and when the machine has made 15 cycles, the projecting pin 42 will engage the projection 43 and raise the pawl 22, which will release the ratchet wheel 19 and permit the feed bar to be returned by means of the weights 15.

Connected to the shaft 18 is a pinion 44 which is in mesh with a gear wheel 45 journaled on a stud 46. Connected to the gear wheel 45 is a stop projection 47, and adjustably mounted in the frame of the machine is a set screw 48ª in the line of movement of the stop 47 and which is arranged to stop the feed bar at its rearmost position.

Keyed to a shaft 48, which is journaled in the frame of the machine, are arms 49; and connected to these arms by means of the nuts 50 is the confection tube holding bar 51 which is provided with a plurality of openings 52 which are adapted to register with the tubes 7 when the holding bar is in the position, shown in Fig. 5.

49ª are arms extending from the holding bar 51 and are loosely journaled on a sleeve 60, loosely mounted on the shaft 48. Slidably mounted on one side of the holding bar 51 are the centering plates 53; and slidably mounted on the other side of the holding bar, are the pinch plates 54. The centering plate 53 at one edge of the holding bar, and the pinch plate 54 at the same edge, are connected to each other by means of an interposed distance piece 55, as shown in Fig. 11. The centering plate and pinch plate at the other side of the holding bar are connected by a similar piece 55. Journaled on studs in the holding bar 51 are pinions 56, there being one pinion at each end of the bar. Both ends of each of the pinch plates 54 are provided with racks which engage the pinions 56 on opposite sides thereof, so that when one of the plates is moved in one direction, the other plate will be moved in a reverse direction. Interposed between one of the pinch plates 54 and the supporting frame for the holding bar 51 are coil springs 57ª, which tend to hold the bars in a closed position.

Slidably mounted in guides in the holding bar 51 are blocks 57, which are provided with anti-friction rollers 58, arranged to be engaged by cams 59, connected to the sleeve 60 on the shaft 48. These blocks are also provided with racks 61 which are in mesh with pinions 62 journaled on pins mounted in the holding bar 51. Each end of the inner pinch plate 54 is provided with a rack 63, these racks being in mesh with pinions 62. Therefore, when the blocks 57 are moved inwardly, the pinch plate 54 and the centering plates 53 will be moved from each other.

Slidably mounted in guides in the holding bar 51, adjacent to the centering plates 53, is a stop plate 64, which is provided with racks 65 on the bottom thereof, which are in mesh with sectors 66 on a shaft 67 journaled in the holding bar 51. Connected to the shaft 67 is a pinion 68 which is in mesh with a rack 69 on a spring pressed slide 70, mounted in guides in the bar 51.

71 is a spring within the slide 70 and which is arranged to normally hold the parts in such a position that the stop plate 64 will be withdrawn from below the openings in the holding bar 51.

72 is a roller on the slide 70 and which is arranged to be engaged by a cam 73 mounted on the sleeve 60. This cam is arranged to hold the stop plate under the openings in the holding bar 51 against the action of the spring 71, as can be clearly seen by reference to Fig. 5.

By the use of the various gears and racks, the stop plate 64 will be moved at a comparatively higher rate of speed than the slide 70 and will be moved a distance considerably greater than the movement of the said slide.

Slidably mounted on rods 74, which are connected to a projection 75 extending from the frame of the machine, is a slide 76. This slide is provided with a rack 77 which is in mesh with a gear wheel 78 keyed to the shaft 48. Keyed to a shaft 79 journaled in the frame of the machine is a sector 80 having a plurality of antifriction rollers 81 at its periphery which are arranged to engage a cam face 82 on the slide 76 to raise the slide and actuate the gear wheel 78 to rotate the shaft 48, as hereinafter described. Connected to the shaft 48 is a lever arm 83, which is provided with an adjustable counterweight 84 arranged to counterbalance the movement of the confection tube holding bar 51, as hereinafter described.

Slidably mounted in guides on the frame of the machine is a tank 85 for the moisture resisting material, which is arranged to be moved in a horizontal direction by means of levers 86 keyed to a shaft 87, one end of these levers being loosely connected to lugs on the tank 88, while the other ends are provided with rollers 89 engaged by cams 90 on a shaft 91, also journaled in the frame of the machine.

Extending upwardly through lugs 92 in the tank 85 are rods 93. Connected to the upper ends of these rods is a frame 94 located within the tank 85. This frame is provided with a reservoir 95, the upper end of which is inclosed by means of a plate 96, and extending through the plate 96 are the injecting nozzles 97, the number of nozzles being equal to the number of openings 52 in the holding bar 51.

98 is a pressure box which is mounted on guide rods 98ª for the frame 94, which is in communication with the chamber 95 by means of an opening 99 when the frame 94 is raised as shown in Fig. 6. Communicating with the interior of the box 98 is a pipe or tube 100 connected to any source of pressure supply. Within the box 98 is a plate 101 provided with perforations to equalize the pressure below the plate, so that the pressure will be equally applied to the entire length in the space below the plate 101 and thereby equalize the pressure in all of the nozzle 97 when pressure is admitted to the pipe 100.

The lower ends of the rods 93 are connected to a cross-head 102, provided with a downwardly extending fork in which is journaled a roller 103 arranged to be engaged by a cam 104 on the shaft 91.

Pivotally mounted so as to swing below the feed tube 7, is a check plate 105, normally held in its retracted position by means of a spring 106, as indicated in Fig. 5 of the drawings. Mounted in the slide above the tank 85, is a spring pressed plunger 107, the tension of the spring being adjusted by means of the thumb screw 108. Mounted above the plunger 107 is a spring contact 108ª, which is in electrical connection with one pole of a battery 109. The other pole of the battery is connected to another portion of the tank 85; the contact 108ª being insulated from the remainder of the machine. Extending upwardly from the plunger 107 is a contact 110 and when the spring plunger is moved so that contact is made between the points 110 and the contact 108ª, in a manner hereinafter described, the circuit will be closed through the battery 109.

Connected to the front of the machine is a casing 111 provided with a lift valve 112 arranged to open and close the openings from the casing 111 to the syrup feeding tubes 113, and are in longitudinal alinement with the tubes 7 and with the openings 52 in the holding bar 51. The valve 112 is provided with forwardly extending projections 114, which are pivotally mounted at 115 within the casing 111. Mounted within a longitudinal recess within the valve 112 is a rock shaft 116, provided with an arm 117, which extends through an opening in the valve. The ends of the shaft 116 extend outwardly through the valve casing; and mounted on one end of this shaft is a pinion 118 in mesh with the segmental rack 119 which is journaled at 120 to an extension from the casing 111. Connected to an arm extending from the segmental rack 119 is an adjustable roller 121 arranged to be actuated by a cam 122 on the shaft 25.

Connected to the upper end of the valve casing 111 is a syrup feeding pipe 123 leading to a pump 124, having a piston connected to a piston rod 125, which is in turn connected to a link 126. The other end of this link is adjustably connected to one end of a lever 127 which is pivoted at 128 to a standard secured to the end of the machine. The other end of this lever 127 is provided with a roller 129 arranged to be engaged by a cam 130 on the shaft 79.

131 designates the syrup tank connected to the pump 124, the pipes leading from the tank to the pump and from the pump to the valve casing 111 are provided with suitable check valves 132. By means of the adjustable connection between the link 121 and the lever 127, the stroke of the piston in the pump 124 can be adjusted so as to feed a predetermined amount of syrup to the tubes to be filled, as hereinafter described.

Mounted on each side of the syrup tubes 113 are the pinch bars 133. These pinch bars are pivotally connected at both ends to short studs 134, which are connected to projections extending from the frame of the machine. The arms at the ends of the pinch bars through which the journal pins 134 extend are provided with gear teeth 135. Meshing with the gear teeth on the arms of the front pinch bar is a gear wheel 136, which, in turn, meshes with the gear wheel 137 which is in mesh with the gear teeth 135 on the arm of the rear pinch bar. Pivotally connected to lugs on the rear pinch bar are links 138, which are connected to arms 139 of bell-crank levers 141, on a shaft 140 there being one at each end of the bar, each bell crank having an adjustable roller 142 at the upper end thereof, which is arranged to be actuated by the cam 143 on the shaft 25.

143ª are tension springs connected to the front pinch bars and the arms 144 extending outwardly from the frame of the machine are arranged to return the pinch bars to their open position. Pivotally mounted on pins 145 on collar keyed to the shaft 140, are the levers 146, one of said levers having an arm 147 to which is connected an adjustable roller 148 which is arranged to be actuated by a cam 149 on the shaft 25, and 147ª is a spring for returning the arm to its uppermost position. Pivotally connected to the levers 146 are the stripper plates 146ª, which normally lie between the pinch bars 133. These pinch bars 133 are hollow and are provided with nipples 150 which are connected by means of flexible tubes 151 with a heater 152 for heating water which circulates through the pinch bars to keep them heated to a predetermined temperature.

153 is a burner for heating the moistened resisting material in the tank 85.

154 is the main driving shaft having a tight and loose pulley 155 and 155ª respectively, which can be belted to any suitable source of power. Connected to the shaft 154 is a pinion 156 which meshes with the gear wheel 157 on the shaft 25. This gear wheel 157 is also in mesh with the gear wheel 158 on the shaft 79. Connected to the shaft 25 is a second gear 159 which is in mesh with the gear wheel 160 on the sleeve 60 mounted on the shaft 48.

161 is a gear wheel on the shaft 79 which is in mesh with the gear wheel 162 on the shaft 91.

163 is a valve in the pressure pipe 100 and pivoted to the upper end of the valve casing is a lever 164 arranged to be actuated by a cam 165 on the shaft 79 to open the valve at a predetermined time to admit pressure to the box 98 in the tank 85.

Pivotally mounted on standard 166 on the frame of the machine and above the rack 8 are levers 167, and pivoted to these levers is a plate 168, the lower end of which is connected by means of a cord 169 to a stop 170.

The tubes to be filled are first placed in grooves in a corrugated plate 171, the corrugations of which match with the grooves 4 in the racks 3. This plate is then placed on the rack above the feed bar 10 and the weighted lever 172 connected to one of the levers 167 is raised into the position shown in dotted lines in Fig. 3. The movement of these levers will swing the plate 168 into the position shown in dotted lines to push all of the tubes on the corrugated plate to their proper position. The plate 168 is held in this position and the corrugated plate 171 is withdrawn, which leaves the tubes at their proper point in the rack 3. The machine is now started and the slide 21 being actuated by the cam 24, moves the ratchet wheel 19 the distance of one tooth, and feeds a confection tube to each of the tubes 7, as before described.

The tubes 5 will drop down through the tubes 7 and into the openings 52 in the bar 51, the parts being in the position shown in Fig. 5, the stop plate 64 being in position under the openings 52 to retain the tubes in their proper position in the holding bar. The further movement of the machine will actuate the blocks 57 through the medium of the cams 59 to move the centering plates 53 and the pinch plates 54 away from each other, and permit the plugs 179, which dropped between the pinch plates at the end of the previous operation, to drop from between the plates and permit the springs 57 to close said plates, after the cams have moved beyond the blocks 57. The cams 90 will now engage the rollers 89 on the lever 86 and move the tank 85 so as to bring the tubes 97 under the confection tubes 5. During this inward movement of the tank, a spring pressed lug 173 on the cover of the said tank 85 will engage one of the pinch plates, and through the medium of the gearing heretofore described, will give both pinch plates the final movement to seal the upper ends of the tubes 5, as clearly shown in Fig. 6. During the movement of the tank 85, the plunger 107 mounted above the tank will engage the check plate 105 and move it against the action of the spring 106 into the position shown in Fig. 6. If any of the tubes 5 should stick at the mouth of the tube 7, the check plate 105 would meet with resistance, which would move the plunger 107 against the action of its spring and close an electric circuit through contacts 110 and 108, and thereby ring a bell included in the circuit and notify the operator that one of the tubes 5 was stuck in one of the feed tubes 7. He would immediately throw the belt from the tight pulley to the loose pulley and bring the machine to a state of rest, to clear the machine before the next round. The resistance of the tube 5 against the check plate 105 is not sufficient to stop the plate 105 from being moved under the tube 6 into the position shown in Fig. 6, as the tension of the spring acting on the plunger 107 is sufficient to break the tube after it had been compressed to a certain extent; and as soon as the tube 5 is broken, the check plate will move to a position to close the lower ends of the feed tubes 6. It is essential to move this check plate to this position before pressure is admitted to the box 98 in the tank 85, so as to close the lower ends of the tubes 7 to prevent moisture resisting material from being injected into the tubes 7 if a confection tube 5 has not been delivered to one of the openings 52 in the holding plate. Immediately after the tank 85 has been moved to the position just described, the cam 104 will engage the roller 103 which is connected to the crosshead on the ends of the rods 93. This will raise the frame 94, together with the plate 96 and the nozzles 97 connected thereto, into the position shown in Fig. 6, so that the nozzles 97 are moved upwardly, into the confection tubes 5. After these tubes have been moved upwardly, the cam 165 on the shaft 79 will actuate the lever 164 to open the valve 163 to permit air pressure to flow through the pipe 100 to the box 98, and force hot moisture resisting material up through the nozzles 97 into the confection tubes 5 to entirely coat the interior of these tubes, the surplus moisture resisting material flowing back to the tank through a strainer 174. This strainer will also prevent any pieces of broken tubes 5 from entering the tank. Slidably mounted in the front of the tank is a plate 175 which is held in its upward position by means of springs 176; connected to the rods 177, which are in turn connected to the frame 94. These rods are arranged to engage the flange on the bottom of the plate 175 to move the plate downwardly when the frame 94 is lowered.

As the frame 94 is moved upward, the bars 177 will permit the springs 176 to move the plate 175 up against the bottom of one of the centering plates 53 to prevent any of the moisture resisting material from splashing onto the stop plate 64. The cam 165 will now pass off the roller on the lever 164 and permit the valve 163 to close, and immediately thereafter the cam 104 will pass from under the roller 103 and permit the frame, together with the various parts connected thereto, to drop by gravity, and during the downward movement thereof, the arms 177 moving the plate 175 downwardly against the action of springs 175. The cams 90 will then move from under the rollers 89 and permit the tank 85 to be moved to the position shown in Fig. 5 by means of the weighted lever 178 on the shaft 87. The rollers 81 on the sector 80, which is mounted on the shaft 79, will now engage the cam surface 82 on the slide 76, and through the medium of the rack 77 on the slide and the gear wheels 78 on the shaft 48, the shaft 48 will be rotated 180°. This brings the holding bar 51, together with all of the parts connected thereto, to the position shown in Figs. 10 and 11, so that the open mouths of the confection tubes 5 will be brought below the syrup nozzles 914, and the various parts will be held in this position during the passage of the rollers 81 over the concentric portion 82 of the cam on the slide 76. As soon as the holding bar has been brought to this position, the cam 916 on shaft 25 will engage the roller 915 to raise the valve 112 through the medium of the pinion 118 and sector 119; and as soon as the valve is opened, the cam 130 on the shaft 79 will actuate the syrup pump 124, as heretofore described, to inject a predetermined amount of syrup into each of the confection tubes 5. Immediately after the syrup has been injected into the confection tubes the valve 112 will be lowered to close the openings to the nozzles 113. Immediately after the valve 904 has been closed, the cam 143 will engage the roller on the arm 141, and through the medium of the links 138 and the gear connections between the pinch bars 133, the bars will be moved toward each other to close the ends of the confection tubes 5, as shown in Fig. 11. As soon as the cam 143 passes the roller 142, the springs 143ᵃ will return the pinch bars 133 to the position shown in Fig. 10. At the same time, the cams 184 on the shaft 25 will engage the rollers on levers 185 pivoted on the shaft 140. The levers 185 will engage pins 186 on the slides 57 to open the pinch plates 54 and the centering plates 53; and permit the filled confection tubes to be drawn out of the holding bar 51. After the centering and pinch plates have been moved to their open positions, the holding bar 51 will be moved to the position shown in Fig. 5 in a manner hereinafter described and the stripper plates 146 will be moved downwardly by means of the cam 149 on the shaft 25 to scrape the tubes 5 from the hot pinch bars 133.

Slidably mounted in sleeves in the holding bar 51, at each end thereof are square plugs 179 which are provided with screws 180 adapted to move in slots 181 in the sleeves and which are arranged to limit the movement of the plugs 179. The ends of the plugs 179 will drop between the centering plates when the latter are opened after the filling operation, to prevent them from being returned by the springs 57 after the cams 184 pass off from the rollers on levers 185. The pinch bars and pinch plates will therefore be held in their open position to receive the next set of confection tubes 5, after the bar is moved to the position shown in Fig. 5.

After the pinch plates 133 are closed as described rollers 81 on the sector 80 pass beyond the concentric portion 82 on the slide 76, the slide will drop by gravity, and the rack 77 on the slide will rotate the gear 78 180° in the reverse direction to bring the holder bar 51 to the position shown in Fig. 5 to receive another set of tubes to be filled. The downward movement of the slide 76 will be counteracted by the counterweight secured to the shaft 48 and the dash-pot 182, shown in Fig. 1. As soon as the holding bar 51 has been moved to the position under the conveyer tube 7, as shown in Fig. 5, the cam portion 73 will engage the roller 72 to push the guard plate 64 into the position shown. The operation of the machine will then be repeated to fill the next set of confection tubes and will be continued until all the confection tubes in the rack have been filled. As soon as the last cross row of confection tubes has been fed into the chute 6, the pawl 22 will be lifted from engagement with the ratchet wheel 19, as previously described, to permit the feeding bar 10 to fall into its rearmost position, at which time the machine will be stopped preparatory to filling the rack with another set of confection tubes.

The advantages of our invention result from the provision of an apparatus for filling confection tubes, whereby the openings at one end of a plurality of confection tubes are simultaneously sealed and the interiors of the tubes are then coated with moisture-resisting material, after which the tubes are filled with a predetermined amount of syrup, and the open ends thereof are sealed to retain the syrup within the tubes.

Another advantage of our invention results from the provision of a machine into which the various steps are carried out automatically, and in which the upper ends of the tubes are closed at the same time that the tubes are centered in the holding device. Further, from the provision of means for automatically injecting water-proofing material into the open ends of the tube to thoroughly coat the interior of the walls thereof. Further, from the provision of means for reversing the holders to bring the open mouths of the tubes below the syrup nozzles through which the tubes are filled with a predetermined amount of syrup. Also in the provision of means for automatically injecting the syrup into the tubes. Further, from the provision of means for automatically sealing the open ends of the tubes after they have been filled, together with means for freeing the tubes from the closing devices.

We claim:

1. A confection tube filling machine comprising an oscillating holding bar, said holding bar having a plurality of openings to receive the tubes to be filled, a charging station for charging tubes into said openings, means for closing one end of each of the tubes, mechanism for shifting the holding bar from the charging station to a filling station, means for filling said tubes, and means for closing the open ends of the tubes after they have been filled; substantially as described.

2. A confection tube filling machine, comprising an oscillating holding bar, said holding bar having a plurality of openings to receive the tubes to be filled, automatic means for charging tubes into said openings, centering plates for holding said tubes in proper position on the holding bar, a filling station, mechanism for shifting the holding bar from the charging station to the filling station, means for filling the tubes, and means for closing the ends of the tubes after they have been filled; substantially as described.

3. A confection tube filling machine, comprising a holding bar for hollow confections to be filled, a pinch plate for closing one end of the tubes slidably mounted above the holding bar, gearing connecting the pinch plates to each other, and a spring for closing the pinch plates; substantially as described.

4. Apparatus for filling confection tubes, comprising a holding device for a tube to be filled, a feeding device for automatically feeding the tube to the holding device, a pinching device for closing one end of the tube, a nozzle for injecting moisture resisting material into the tube through the open end thereof, a second nozzle for injecting syrup into the tube, and a second pinching device for closing the open end of the tube through which the syrup has been injected; substantially as described.

5. A confection tube filling machine, comprising a holding bar for a hollow confection tube to be filled, pinch plates for closing one end of the tube, means for filling the tube, and pinch bars for closing the other end of the tube after it has been filled; substantially as described.

6. A confection tube filling machine, comprising a swinging holding bar having a plurality of openings for receiving the tubes to be filled, pinch plates slidably mounted on the bar for closing the upper ends of the tubes, actuating mechanism connected to the holding bar to swing the bar to bring the open ends of the tubes above the closed ends, means for filling the tubes, pinch bars for closing the other ends of the tubes, and actuating mechanism for moving the pinch bars; substantially as described.

7. A confection tube filling machine having a holding bar provided with a plurality of openings for holding the tubes to be filled, pinch plates slidably mounted on the bar for closing one end of each of the tubes, actuating mechanism connected to both of the pinch plates for moving both plates simultaneously, and means for actuating the plates to close one end of each of the tubes; substantially as described.

8. A confection tube filling machine having a plurality of openings in alinement with each other for receiving tubes to be filled, pinch plates slidably mounted on one side of the holding bar, actuating mechanism for moving the pinch plates, and centering plates slidably mounted on the other side of the holding bar; substantially as described.

9. A confection tube filling machine having a holding bar provided with a plurality of openings in alinement with each other for receiving the tubes to be filled, feeding mechanism for feeding the tubes to the holding bar, pinch plates slidably mounted on one side of the holding bar, and actuating mechanism for simultaneously moving the two plates toward and from each other; substantially as described.

10. A confection tube filling machine having a holding bar provided with a plurality of openings in alinement with each other for receiving the tubes to be filled, feeding mechanism for feeding the tubes to the holding bar, pinch plates slidably mounted on one side of the holding bar, actuating mechanism for simultaneously moving the two plates toward and from each other, and centering plates mounted on the other side of the holding bar arranged to be moved toward and from each other; substantially as described.

11. A confection tube filling machine having a holding bar provided with a plurality of openings in alinement with each other for receiving the tubes to be filled, feeding mechanism for feeding the tubes to the holding bar, pinch plates slidably mounted on one side of the holding bar, actuating mechanism for simultaneously moving the two plates toward and from each other, centering plates mounted on the other side of the holding bar connected to the pinch plates, springs for moving the pinch plates and the centering plates toward each other, and a cam for opening the pinch plates and the centering plates; substantially as described.

12. A confection tube filling machine having a holding bar provided with a plurality of openings for receiving the tubes to be filled, a stop plate slidably mounted below the holding bar, pinch plates slidably mounted above the holding bar, actuating mechanism for moving the plates toward and from each other, and actuating connections for moving the stop plate below the openings in the holding bar; substantially as described.

13. A confection tube filling machine having a swinging holding bar provided with a plurality of openings for holding the tubes to be filled, pinch plates slidably mounted on the bar for closing one end of each of the tubes, actuating connections for moving the plates toward each other to close one end of the tubes, actuating connections for swinging the holding bar 180°, means for filling the tubes, and pinch bars for closing the other ends of the tubes after the bar has been swung to its last mentioned position; substantially as described.

14. A confection tube filling machine having a holding bar provided with a plurality of openings for receiving the tube to be filled, pinch plates slidably mounted on the bar for closing one end of each of the tubes, means for moving the holding bar to bring the open ends of the tubes above the closed ends, a filling device for filling the tubes, pinch bars for closing the other ends of the tubes, actuating mechanism for moving the pinch bars to close the other ends of the tubes, springs for opening the pinch bars, and stripper plates for stripping the filled tubes from the pinch bars; substantially as described.

15. A confection tube filling machine having a clamping device provided with a plurality of openings for receiving the tubes to be filled, intermittently actuated mechanism for feeding the tubes to the holding bar; mechanism for actuating the clamping device substantially as described.

16. A confection tube filling machine having a clamping device provided with a plurality of openings for receiving the tubes to be filled, conveyer tubes leading to said openings in the holding bar, intermittently actuated mechanism for feeding the confection tubes to the conveyer tubes; mechanism for actuating the clamping device substantially as described.

17. A confection tube filling machine having a holding device provided with a plurality of openings for receiving the tubes to be filled, a conveyer tube leading to each of the openings, a rack having a plurality of grooves, the grooves in the rack being in alinement with the conveyer tubes, a feed bar for moving the confection tubes longitudinally toward conveyer tubes, intermittently actuated mechanism for moving the feeding bar; mechanism for actuating the clamping device substantially as described.

18. A confection tube filling machine comprising a rack, said rack having a plurality of grooves for receiving the confection tubes to be filled, each of the grooves being long enough to receive a number of said tubes, a transverse feeding bar extending across the rack, ratchet mechanism for moving the feeding bar step by step along the rack to feed the tubes to the machine, and counterweights for returning the feeding bar to its initial position; substantially as described.

19. A confection tube filling machine having a clamping device for receiving the tubes to be filled, mechanism for feeding the tubes to the clamping device a tank for holding moisture resisting material mounted below the holding bar, and means for injecting water-proofing material from the tank into the tubes to be filled to water-proof the inner walls thereof; substantially as described.

20. A confection tube filling machine having a holding bar provided with a plurality of openings for receiving the tubes to be filled, pinch plates for closing the upper ends of said tubes, actuating mechanism for moving the pinch plates toward each other for closing one end of each of the tubes, a tank containing moisture resisting material mounted below the holding bar having a plurality of injector nozzles, means for moving the nozzles into the tubes to be filled, and means for forcing moisture resisting material from the tank into each of the tubes; substantially as described.

21. A confection tube filling machine, comprising a casing for holding the filling syrup, a plurality of nozzles extending downwardly from said casing, a valve within the casing for opening and closing the openings to the nozzles, holder, mechanism for filling said holder with tubes, automatic means for moving the holder to bring the tubes to be filled under the nozzles and in alinement therewith, and automatic valve actuating mechanism arranged to shift the valve after the tubes have been brought into alinement with the nozzles to permit the syrup to be injected from the casing into the tubes; substantially as described.

22. A confection tube filling machine, comprising a casing for retaining the filling syrup, nozzles extending downwardly from said casing, a valve device arranged to open and close the opening from the casing to the nozzles, a movable holder for supporting a plurality of tubes to be filled below the nozzles and in alinement therewith, mechanism for automatically filling said holder with tubes, mechanism for moving the holder actuating mechanism for opening the valve, and a pump connected with said casing for forcing the syrup into the tubes; substantially as described.

23. A confection tube filling machine, comprising a casing for retaining the filling syrup, a plurality of nozzles extending downwardly from said casing, a valve within the casing arranged to simultaneously open and close the openings from the casing to the nozzles, means for supporting a plurality of tubes to be filled below the nozzles and in alinement therewith, actuating mechanism for opening the valve, a pump connected with said casing for forcing the syrup into the tubes, and pinch bars for closing the tubes after they have been filled, together with actuating mechanism for moving the pinch bars; substantially as described.

24. A confection tube filling machine, comprising a casing for retaining the filling syrup, nozzles extending downwardly from said casing, a valve within the casing arranged to open and close the openings from the casing to the nozzles, means for supporting a plurality of tubes to be filled below the nozzles and in alinement therewith, actuating mechanism for opening the valve, a pump connected with said casing for forcing the syrup into the tubes, pinch bars for closing the tubes after they have been filled, actuating mechanism for moving the pinch bars, springs for opening the pinch bars, and stripper plates for stripping the confection tubes from the pinch bars during the opening movement thereof; substantially as described.

25. A confection tube filling machine, comprising a holding bar for hollow confections to be filled, a pinch plate for closing one end of the tubes slidably mounted above the holding bar, gearing connecting the pinch plates to each other, and a spring for closing the pinch plates, together with mechanism for actuating said gearing to open the pinch plates; substantially as described.

26. A confection tube filling machine, comprising a swinging holding bar for holding a plurality of confection tubes, means for feeding tubes to said holding bar, means for closing one end of each tube, a tank containing moisture resisting material, a plurality of nozzles communicating with said tank, mechanism for moving said tank in a horizontal direction to bring the nozzles under the tubes, mechanism for moving said nozzles upwardly into the open ends of the confection tubes, and means for simultaneously injecting moisture resisting material into said tubes through said nozzles; substantially as described.

27. A confection tube filling machine, comprising a holding bar for holding a plurality of confection tubes, automatic mechanism for simultaneously feeding a plurality of tubes to said holder, mechanism for simultaneously closing one end of each of said tubes, a movable tank containing moisture resisting material, a plurality of nozzles mounted within said tank, means for moving the tank under the holding bar, mechanism for moving the nozzles into the open ends of the tubes, a pressure actuated device connected to said tank for injecting moisture resisting material in said tubes through the nozzles, and mechanism for shifting the holder to invert the tubes; substantially as described.

28. A confection tube filling machine, comprising a holding bar for hollow confections, a tank for moisture resisting material slidably mounted below the holding bar, actuating mechanism for moving said tank under the holding bar, a reciprocating frame within said tank, a plurality of nozzles mounted on said frame, and mechanism for raising the frame to insert the nozzles into the tube; substantially as described.

29. A confection tube filling machine, comprising a holding bar for hollow confections, a tank for moisture resisting material slidably mounted below the holding bar, actuating mechanism for moving said tank under the holding bar, a reciprocating frame within said tank, a plurality of nozzles mounted on said frame, mechanism for raising the frame to insert the nozzles into the tubes, said frame having a chamber in connection with the nozzles, a cap mounted above said frame having a recessed portion adapted to register with the top of the chamber when the frame is raised to form an inclosed chamber in the frame, and means for applying pressure to said chamber to inject the moisture resisting material into the tubes; substantially as described.

30. A confection tube filling machine, comprising a holding member for hollow confections to be filled, a pinch device for closing one end of the tube, a filling device for filling the tube, and a second pinch device for closing the other end of the tube after it has been filled; substantially as described.

31. A confection tube filling machine, comprising a swinging holding member for holding a plurality of tubes to be filled, a pinch device for closing the upper ends of the tubes, actuating mechanism connected to the holding bar to swing the bar to bring the open ends of the tubes above the closed ends, filling mechanism for filling the tubes, and a second pinch device for closing the other ends of the tubes; substantially as described.

32. A confection tube filling machine, comprising a tube holding device, mechanism for feeding tubes to said holding device, mechanism for closing one end of each tube, means for coating the interior of said tubes with a moisture resisting material, automatic mechanism for shifting the holder to invert the tubes and bring them to a filling station, automatically controlled mechanism for filling said tubes, and a pinching device for closing the other ends of the tubes; substantially as described.

In testimony whereof, we have hereunto set our hands.

BENJAMIN A. LAWS.
JAMES McELWAIN.
MOSES M. LAIRD.

Witnesses:
JESSE B. HELLER,
H. M. CORWIN.